Patented Oct. 24, 1939

2,177,154

UNITED STATES PATENT OFFICE 2,177,154

CALCIMINE

Herman A. Scholz, Oak Park, and Alexander Adams, Chicago, Ill., assignors to United States Gypsum Company, Chicago, Ill., a corporation of Illinois No Drawing. Application May 1, 1936, Serial No. 77,450

4 Claims. (Cl. 134—46)

The present invention relates to an improved form of calcimine or distemper paint.

The main object of the invention is to produce a calcimine or distemper paint in which the pigment is mainly some form of calcium sulfate. Such a calcimine which contains gypsum is rendered more opaque and of greater hiding power by the expedient of incorporating within it a substance that, when the calcimine is subsequently mixed with water in order to prepare it for use, will tend to reduce the hydrogen-ion concentration of the mixture so that it will react neutral or slightly alkaline.

It has been found that gypsum, which ordinarily is a rather poor pigment because of its apparent transparency and lack of opacity as compared with pigments generally used in calcimine, can be rendered highly efficacious as a pigment by employing it in a suspension in which the hydrogen-ion concentration is so low that the suspension will react neutral or faintly alkaline so as, for example, not to exceed pH 7.0 to about pH 8.5. This can be accomplished by mixing with the dry calcimine or distemper paint a substance capable of reducing the hydrogen-ion concentration of the resulting paint when the composition is mixed with water. Substances suitable for that purpose are sodium acetate, calcium hydroxide, Portland cement, sodium carbonate, sodium hydroxide, and potassium hydroxide, although other substances having similar neutralizing ability will serve the purpose provided they are compatible with gypsum. These alkaline reacting materials may be added in sufficient quantity so that the resulting mixture will be neutral when mixed with water, or they may be added in excess so that the reaction will be alkaline. An excess of alkalinity does not harmfully affect the increased hiding power of the calcium sulfate, but an excess sufficient to cause damage to brushes or other alkaline sensitive materials naturally should be avoided. While it is usually preferable to keep the pH between 7.0 and 8.5, it is not intended that the pH be confined below 8.5. Thus, a calcimine or distemper paint may be provided in powdered form by making a mixture of finely powdered gypsum, either with or without whiting and/or a siliceous material, such for example as clay, together with dry powdered glue or equivalent adhesive material. To this mixture there is also added some substance from the group of neutralizing substances above recited. After thorough mixing, the materials are ready for use.

Without in any way limiting the invention to the precise formula shown, it may be stated that a composition compounded in accordance with the following formula has been found to be highly satisfactory for the present purpose:

|  | Per cent |
|---|---|
| Powdered gypsum | 80 to 90 |
| Siliceous material, such as clay | 10 to 20 |
| Adhesive, such as glue | 2 to 5 |
| Neutralizing substance, such as sodium acetate | .05 to .2 |

In the above formula, part of the gypsum or clay may be replaced by whiting or other pigment. This pigment may be ordinary ground chalk or whiting, or its equivalent, such as lithopone, zinc white, titanium oxide pigment, barium sulfate, or any other white pigment. Of course, small amounts of coloring matter may also be added if the calcimine is to be tinted. For example, if higher wet or dry opacity is desired, the higher refractive index pigments may be used in part replacement of the gypsum. Whiting may be added when the trade desires specific application or job qualities given by this material, long in use in such products.

The siliceous material may consist of diatomaceous earth, silica, tripoli, talc or clay. The last mentioned material is very suitable for the purpose, both because of its fine state of subdivision and its inexpensiveness. Some of the trade considers that clay improves the ease of application or brushability.

The glue may be any water-soluble adhesive material, either of nitrogenous albuminoid type or other organic substance, such as modified starch, dextrinized starch, dextrin, etc., but it is proposed to employ ordinary glue for this purpose.

Instead of using the sodium acetate, equivalent amounts of Portland cement, sodium carbonate, sodium hydroxide, potassium hydroxide, or calcium hydroxide or hydrate may be employed.

As a preservative, any suitable antiseptic substance may be employed.

All of the ingredients should be very finely powdered, particularly the gypsum and the whiting, if the latter be used. The whiting should preferably be so fine that over 99% thereof will pass through 325 mesh. In general, it may be stated that the more finely ground the materials are, the better the result with the distemper paint.

The material is compounded in a mixer such as, for example, the Broughton type, or its mechanical equivalent.

The function of the neutralizing material is to overcome the natural slight acidity of the gypsum or calcium sulfate, and more particularly to promote better dispersion or deflocculation when the paint composition is mixed with water for use. It appears that the particles of gypsum then do not tend to gather into lumps or to become flocculated, thus resulting in a more uniform mixture of heavier body, which gives better application qualities and increased hiding power.

We claim:

1. A dry calcimine or distemper paint composition comprising as its main pigment powdered gypsum, a water-soluble adhesive, and only sufficient of an alkaline-reacting material to overcome the acidity of the composition, whereby when the composition is gauged with water a coating composition eventuates having a pH of from 7 to 8.5, and in which the gypsum has a high opacity and hiding power.

2. A calcimine or distemper paint as defined in claim 1, in which the alkaline-reacting material is from the group consisting of sodium acetate, calcium hydroxide, Portland cement, sodium carbonate, sodium hydroxide and potassium hydroxide.

3. A calcimine or distemper paint as defined in claim 1 in which the water-soluble adhesive is from the group consisting of glue, starch and dextrine.

4. A calcimine or distemper paint composition consisting of from 80% to 90% of gypsum pigment, 10% to 20% of a siliceous material, 2% to 5% of glue, and less than 1% of an alkaline-reacting substance capable of reducing the hydrogen-ion concentration of the paint when mixed with water to a pH substantially between 7 and 8.5.

HERMAN A. SCHOLZ.
ALEXANDER ADAMS.